F. GOETZE.
PACKING.
APPLICATION FILED AUG. 30, 1907.

922,130.

Patented May 18, 1909.

WITNESSES:
Gustave Dieterich.
Edwin W. Fritard.

INVENTOR
Frederick Goetze
BY Conrad A. Dieterich
his ATTORNEY

UNITED STATES PATENT OFFICE.

FREDERICK GOETZE, OF BURSCHEID, GERMANY.

PACKING.

No. 922,130.    Specification of Letters Patent.    Patented May 18, 1909.

Application filed August 30, 1907. Serial No. 390,798.

*To all whom it may concern:*

Be it known that I, FREDERICK GOETZE, a subject of the German Emperor, residing at Burscheid, Rhenish Prussia, Germany, have invented certain new and useful Improvements in Packings, of which the following is a full, clear, and exact specification.

My invention relates to improvements in means for sealing joints in pipes, containers and receptacles of all kinds, and the same has for its object more particularly to provide a simple, efficient and durable gasket or packing for sealing the joints or connections in apparatus used for retaining or conducting fluids under high pressures, such as superheated steam, oil, air, gases, acids or alkalies.

Further, said invention has for its object to provide an elastic gasket or packing composed partly of a metal body and partly of a non-metallic packing material arranged thereon, and secured thereto which packing will not be affected by the fluid passing through or contained in the receptacles upon which said packings or gaskets are used.

To the attainment of the aforesaid objects and ends my said invention consists in the novel details of construction, and in the combination, connection and arrangement of parts hereinafter more fully described, and then pointed out in the claim.

Figure 1:
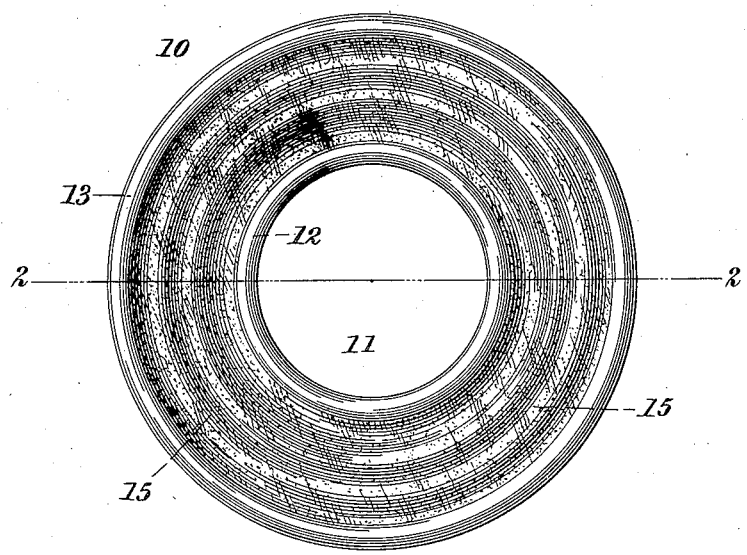
Figure 2:
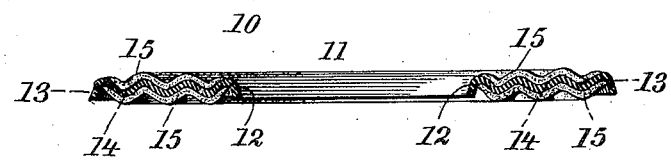

In the accompanying drawings forming part of this specification wherein like numerals of reference indicate like parts, Figure 1 is a face view of a gasket constructed according to and embodying my said invention, and Fig. 2 is a sectional view thereof taken on the line 22 of Fig. 1.

In said drawings 10 designates a disk made of metal or other suitable material, but preferably copper, having a centrally-located aperture 11 therein provided with an upwardly, inwardly and downwardly extending rim or flange 12, and 13 denotes an upwardly, outwardly and downwardly extending flange provided at the periphery of said disk 10, and having its edge in alinement with the edge of the inner flange 12. The portion of the disk 10 intermediate the flanges 12 and 13 is formed of a series of annular concentric corrugations 14, 14 having their upper and lowermost surfaces substantially in alinement with the upper and lower edges of the rims 12, 13 respectively of the disk 10, and 15, 15 denote annular packings formed of suitable material but preferably of a composition of asbestos, which annular packings are permanently and rigidly secured by cement to the said surfaces of the disk 10 and corrugated and conformed to the portion of the disk intermediate the rims or flanges 12 and 13 and the series of annular concentric corrugations 14, 14.

It is to be noted that in my improved packing the portions of the annular packings 15 15 at the apexes or crests of the corrugations 14, 14 on both the upper and underside of the disk project above and below the horizontal planes of the upper and lower edges of the inner and outer rims or flanges 12, 13 of the disk, and that the apexes or crests of said corrugations form solid supports for the packings, which supports are substantially non-yielding when the gasket is inserted and secured intermediate the parts to be joined, and that by reason of this construction a perfectly fluid-tight seal may be produced in which the packing material is held firmly and effectually against the lateral movement upon the metal, retaining disk of the packing.

Having thus described my invention, what I claim and desire to secure by Letters Patent, is:

A gasket comprising an annular plate having integral flanges at its inner and outer edges projecting above and below said plate, a series of concentric, annular corrugations intermediate said flanges, and annular packings conformed to and secured to said corrugations and having the portions arranged upon the apexes of said corrugations projecting in planes above and below the edges of said flanges, substantially as specified.

Signed at Cologne, Rhenish-Prussia, Germany, this 8th day of August, nineteen hundred and seven.

FREDERICK GOETZE.

Witnesses:
LOUIS VANDORY,
M. KNEPPERS.